US007831066B2

(12) United States Patent
Kocher

(10) Patent No.: US 7,831,066 B2
(45) Date of Patent: Nov. 9, 2010

(54) POCKET IDENTIFICATION COLLECTION KIT (PICK)

(76) Inventor: Robert William Kocher, 4828 3rd St. North, Arlington, VA (US) 22203

( * ) Notice: Subject to any disclaimer, the term of this patent is extended or adjusted under 35 U.S.C. 154(b) by 1090 days.

(21) Appl. No.: 11/521,353

(22) Filed: Sep. 15, 2006

(65) Prior Publication Data

US 2008/0069407 A1 Mar. 20, 2008

(51) Int. Cl.
*G06K 9/00* (2006.01)
*G06K 9/22* (2006.01)

(52) U.S. Cl. ....................... 382/115; 382/116; 382/124; 382/313

(58) Field of Classification Search ................. 382/115, 382/116, 124, 313
See application file for complete search history.

(56) References Cited

U.S. PATENT DOCUMENTS

| | | | | |
|---|---|---|---|---|
| 5,101,970 | A * | 4/1992 | Turner | 206/223 |
| 5,613,014 | A * | 3/1997 | Eshera et al. | 382/124 |
| 6,320,974 | B1 * | 11/2001 | Glaze et al. | 382/115 |
| 6,538,623 | B1 * | 3/2003 | Parnian et al. | 345/8 |
| 6,599,481 | B2 * | 7/2003 | Stevens et al. | 422/102 |
| 6,659,038 | B2 * | 12/2003 | Salva Calcagno | 118/31.5 |
| 6,779,665 | B2 * | 8/2004 | Bolanos | 206/569 |
| 6,947,866 | B2 * | 9/2005 | Staab | 702/150 |
| 7,028,892 | B2 * | 4/2006 | Morgan | 235/380 |
| 7,325,837 | B2 * | 2/2008 | Fletcher | 283/105 |
| 7,436,304 | B1 * | 10/2008 | Waterhouse et al. | 340/572.1 |
| 2002/0149610 | A1 * | 10/2002 | Lee | 345/700 |
| 2003/0075598 | A1 * | 4/2003 | Boccacci | 235/380 |
| 2006/0206942 | A1 * | 9/2006 | Sweet | 726/26 |
| 2006/0256739 | A1 * | 11/2006 | Seier et al. | 370/261 |
| 2007/0012760 | A1 * | 1/2007 | Errato et al. | 235/380 |

OTHER PUBLICATIONS

Layton, Julia. “How Crime Scene Investigation Works.” Dec. 2, 2005. HowStuffWorks.com. <http://www.howstuffworks.com/csi.htm> Mar. 12, 2010.*

United States (2006). Human Intelligence Collector Operations: Field manual 2-22.3, Washington, DC: Headquarters, Dept. of the Army. [Chapter 9, 13 and Appendix D].*

“File:50 Cent Mugshot.jpg.” Uncyclopedia, the content-free encyclopedia. Wikia, Oct. 14, 2005. Web. Aug. 18, 2010. <http://uncyclopedia.wikia.com/wiki/File:50_Cent_Mugshot.jpg>.*

* cited by examiner

*Primary Examiner*—Matthew C Bella
*Assistant Examiner*—Michael A Newman
(74) *Attorney, Agent, or Firm*—Andrew K. Wichmana

(57) ABSTRACT

A group of components in a container that forms a kit that is compact for fitting in a pocket and has means for rapidly collecting and recording identification information of personnel in the field and processing collected information at a computer processing station. The kit provides a means for linking collected and recorded biometric data of individuals through the use of a photographic image and a unique identifier. Complete biometric data, photographic data, and biographical information are processed into internationally accepted and law enforcement standards for later use. A method that allows personnel to rapidly collect, record, and link types of identification information and later process collected in a secure location.

20 Claims, 8 Drawing Sheets

POCKET IDENTIFICATION COLLECTION KIT (PICK)

FEDERALLY SPONSORED RESEARCH

Not Applicable

REFERENCE TO A MICROFICHE APPENDIX

Not Applicable

BACKGROUND

1. Field of Invention

This invention relates to collecting biometric samples and information from persons and the use of unique serial numbers to integrate the biometric data with other data about the individual.

2. Description of Prior Art

A central problem in the field of biometrics is the difficulty in rapidly and accurately recording biometrics in a field environment. Especially in the case of fingerprints, most collection systems are large, heavy, time consuming, relatively fragile and very costly. The purpose of these systems is often to create EFTS compliant files which meet the FBI standards. Currently there is no system to quickly, effectively, and easily fingerprint a subject, as the state of the art relies on laptop computers and complicated software that the user must operate, and is thus time consuming and prone to human error. Current art requires the use of forms and ink cards, which are tedious and often very challenging to complete in the field, especially in a language not native to the user. Current art procedures are also extremely labor intensive to compile, and highly prone to confusion, especially of one subject's record with that of another. The same applies to other methods of recording biometrics in the field—records easily become confused or lost, and current equipment is difficult to use and to transport.

Currently, in hostile environments, soldiers and law enforcement officials usually do not record the biometrics of subjects due to time constraints and logistics requirement for carrying extra equipment. Current equipment and methods were designed for police stations or secure areas where processing time was not a consideration. Current equipment required is too heavy, complicated and time consuming to be uses in hostile environments where houses are searched and only 2 to 20 minutes are allowed to be on site before the enemy stage a counter attack or fire weapons on stationary forces. Since current system do not function well in these environments, biometric information is normally not collected and records are not made. Without these records it is difficult to track and identify subjects later on, be they insurgents, criminals or non-combatants. Good biometric records are essential for vetting suspects which leads to a decisive strategic advantage over many types of threats.

OBJECTS AND ADVANTAGES

The object of the Pocket Identification Collection Kit (PICK) is to provide the soldier and law enforcement officer with a light weight, rapid biometrics collection capability that serves as the basis for creating files that are fully compliant with standards and prescribed formats. The advantage of the PICK system is its low cost, light weight and simple to use capability, which collects quality biometric data in the minimal amount of time.

SUMMARY

The PICK (Pocket Identification Collection Kit) is a truly innovative approach to solving the discussed problems and other applications that require light weight and rapid biometric data collection. Through the use of lightweight but durable materials, a compact digital camera, and a system of unique serial numbers, the PICK offers a complete solution for obtaining files to international, national standards such as the FBI's Electronic File Transfer Standard (EFTS) or other compliant files from actions in the field. The kit is small enough to fit in a pocket, can record fingerprints in minutes, highly accurate, and is very simple to operate.

The PICK consists of a photographic system such as a camera or video system, memory media such as memory cards for the photographic system, and biometrics cards or bags with unique serial numbers and audio data providing additional information on the subject and reason for collection. Additional collection consumables are typically provided for ink or powder for fingerprint or palm cards. The PICK's novelty is in the combination of the photographic data, subject's photo, and audio data with unique serial numbered cards or bags that will allow post event processing to reconstruct a file in the required format. An example on linking the subject along with audio data Users fingerprint the subjects and then take digital photographs of them holding the fingerprint cards, displaying the serial number or code on the card. The user also takes video of the subject, asking for the subject's name and other personal information. The memory card for the location is placed in an evidence bag as well as all the fingerprint cards for that location. Later, the bag is delivered to a PICK Processing Station, where the fingerprint cards and the images as well as the videos are matched together, creating a concrete link between each subject's biometric information, an image of their face, and the biographical and personal information contained in the video. This information may then be exported to an EFTS file for further processing or storage.

ITEMS

Item 1 is a unique number, bar code, code, symbol, or unique identification tag.

Item 2 is a camera or video system.

Item 3 is a fingerprint or biometric data collection card

Item 4 is a large evidence container

Item 5 is a small evidence container

Item 6 is an audio capture system

Item 7 is biometric information

Item 8 is a DNA sample

Item 9 is a computer

Item 10 is a device to read biometric information from PICK Cards

Item 11 is software to process the PICK cards

Item 12 is a photograph, video, or other documentation of a unique identifier and other information Item 13 is a memory card or other digital media on which photographs, video or audio is recorded Item 14 is a depiction of the subjects face Item 15 is to represent that the two cards shown are the same card

DETAILED DESCRIPTIONS

FIG. 1

Figure 1:
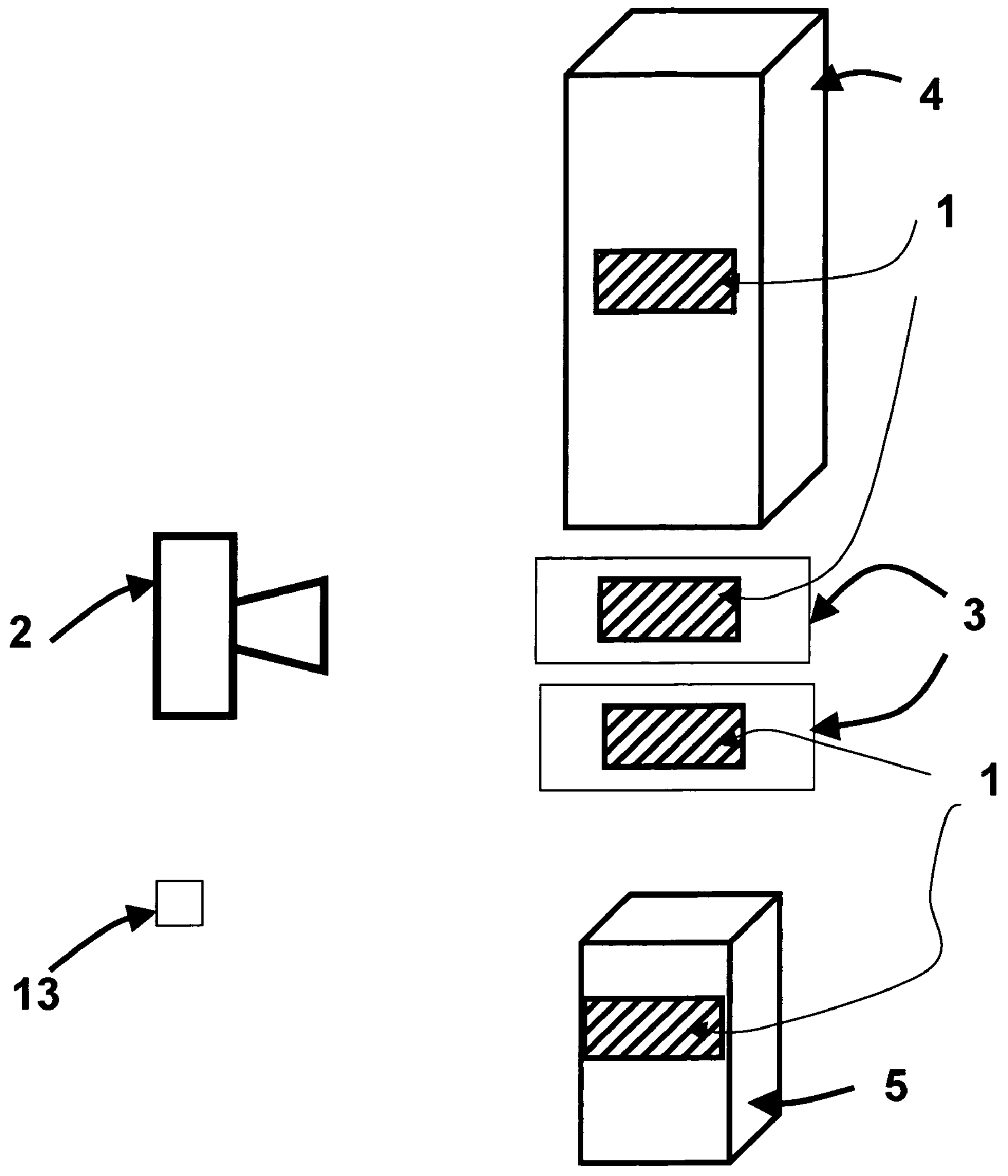
FIG. 1 shows the PICK components.

FIG. 1 depicts items that comprise the PICK. The reusable items in the PICK are a digital camera 2 and an accompanying memory card 13 of adequate size for the expected number of subjects. The other items in the Kit are PICK biometrics cards 3 and large evidence container 4 and small evidence container 5 for safe transportation of these materials both before and after they are used.

FIG. 2

Figure 2:
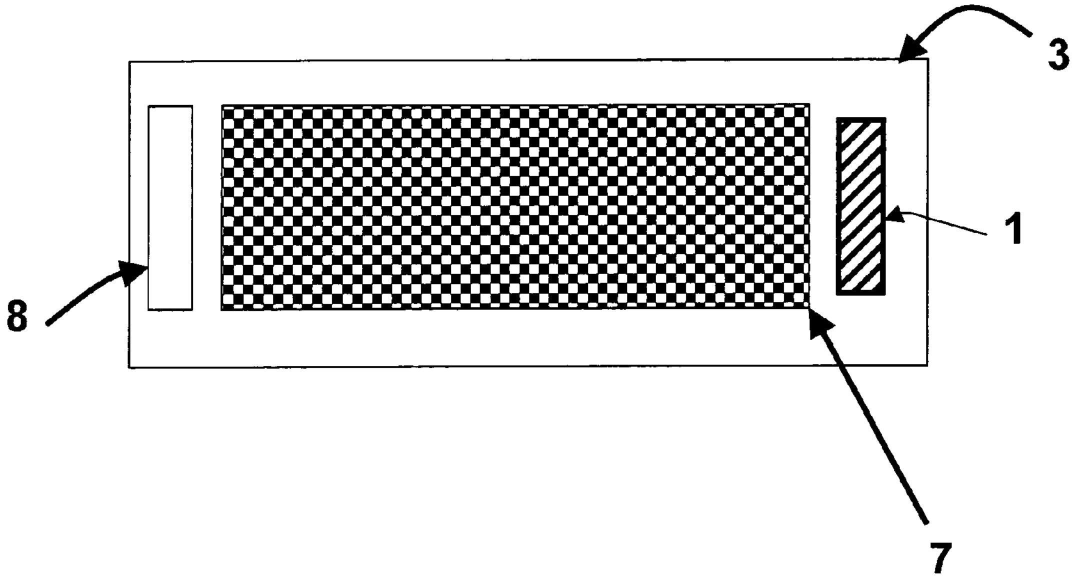
FIG. 2 shows an example of the front of a PICK Card

FIG. 2 depicts an example of the front of a PICK card 3. A PICK card 3 consists of a unique identifier (a serial number, code, or symbol) 1, a space for biometric information 7, and a space for a DNA sample 8 to be attached to the card 3. If a card was, for instance, designed to collect fingerprints 7, it may be simple ink on paper, adhesive fingerprint cards for use with fingerprint powder, or any other physical method for recording a subject's fingerprints. A plastic cover may be used to protect the prints, and is necessary if an adhesive card is used.

FIG. 3

Figure 3:
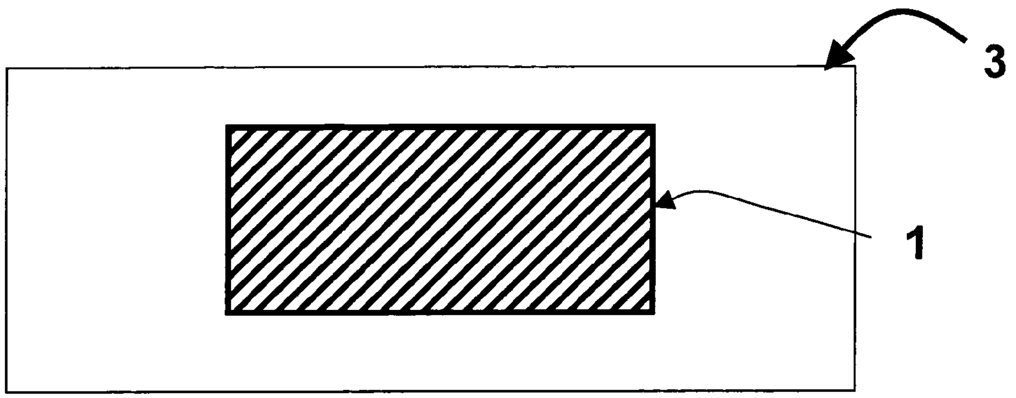
FIG. 3 shows an example of the back of a PICK Card

FIG. 3 shows an example of the back of a PICK card 3. A unique identifier 1 is printed in large type on the back for easy deciphering later. The unique identifier 1 matches the identifier 1 on the front of the card.

FIG. 4

Figure 4:
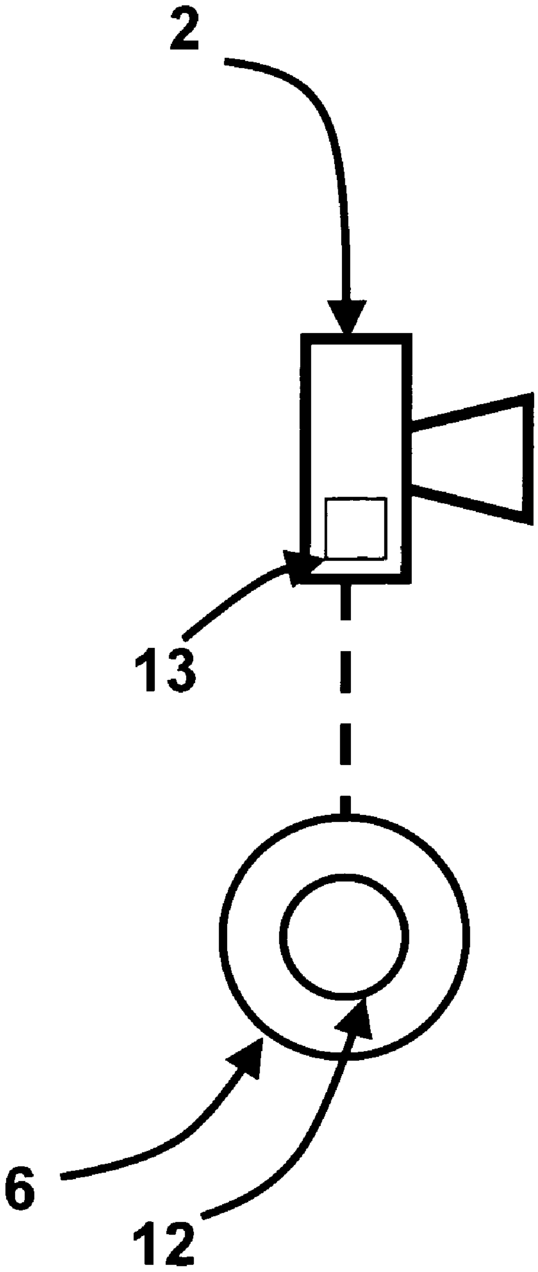
FIG. 4 shows the camera capturing voice, video and photographs

FIG. 4 shows an example of the camera 2 with integrated or attached video 12 and audio 6 capabilities to record on to a memory card 13. This includes data about the circumstances, about the subject as well as the unique identifier 1.

FIG. 5

Figure 5:
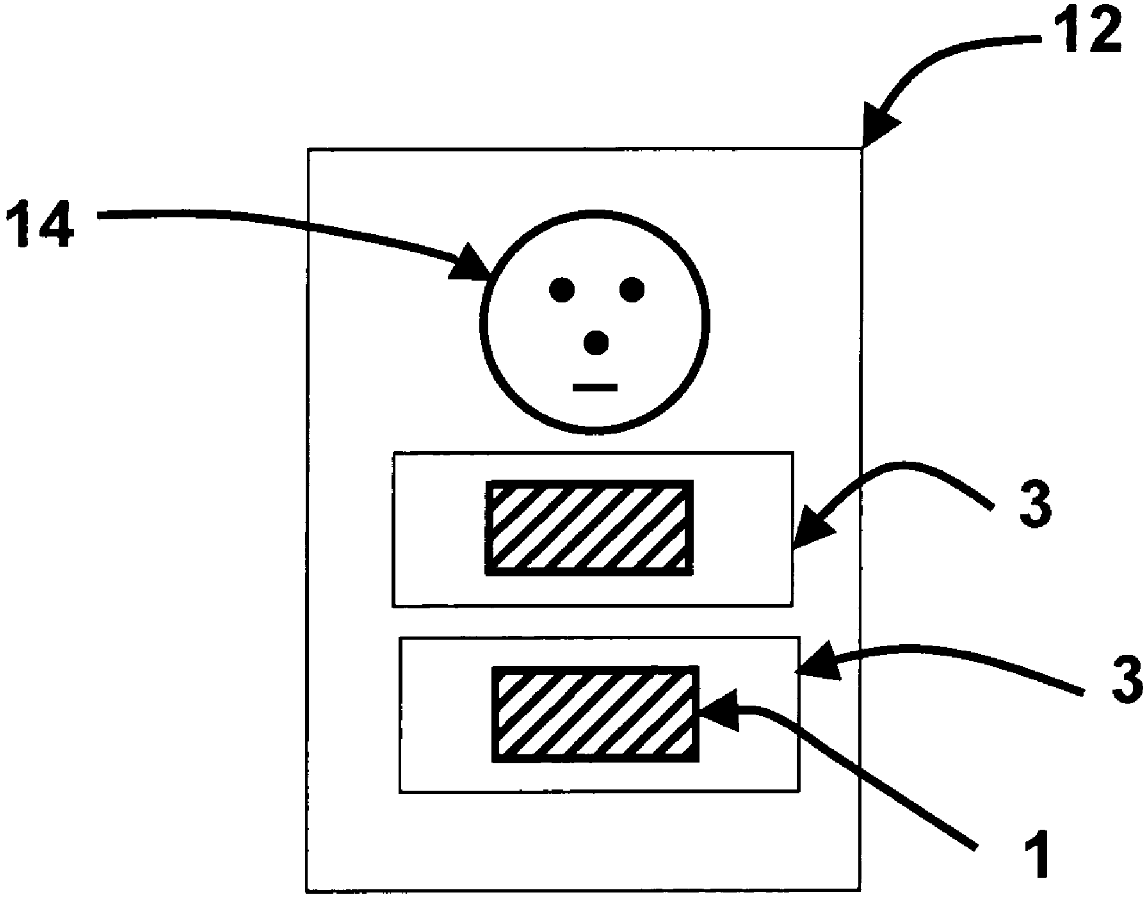
FIG. 5 shows a photograph of a subject displaying PICK cards

FIG. 5 shows a photograph 12 displaying the subject 14 and the cards 3 which display the unique identifier 1.

FIG. 6

Figure 6:
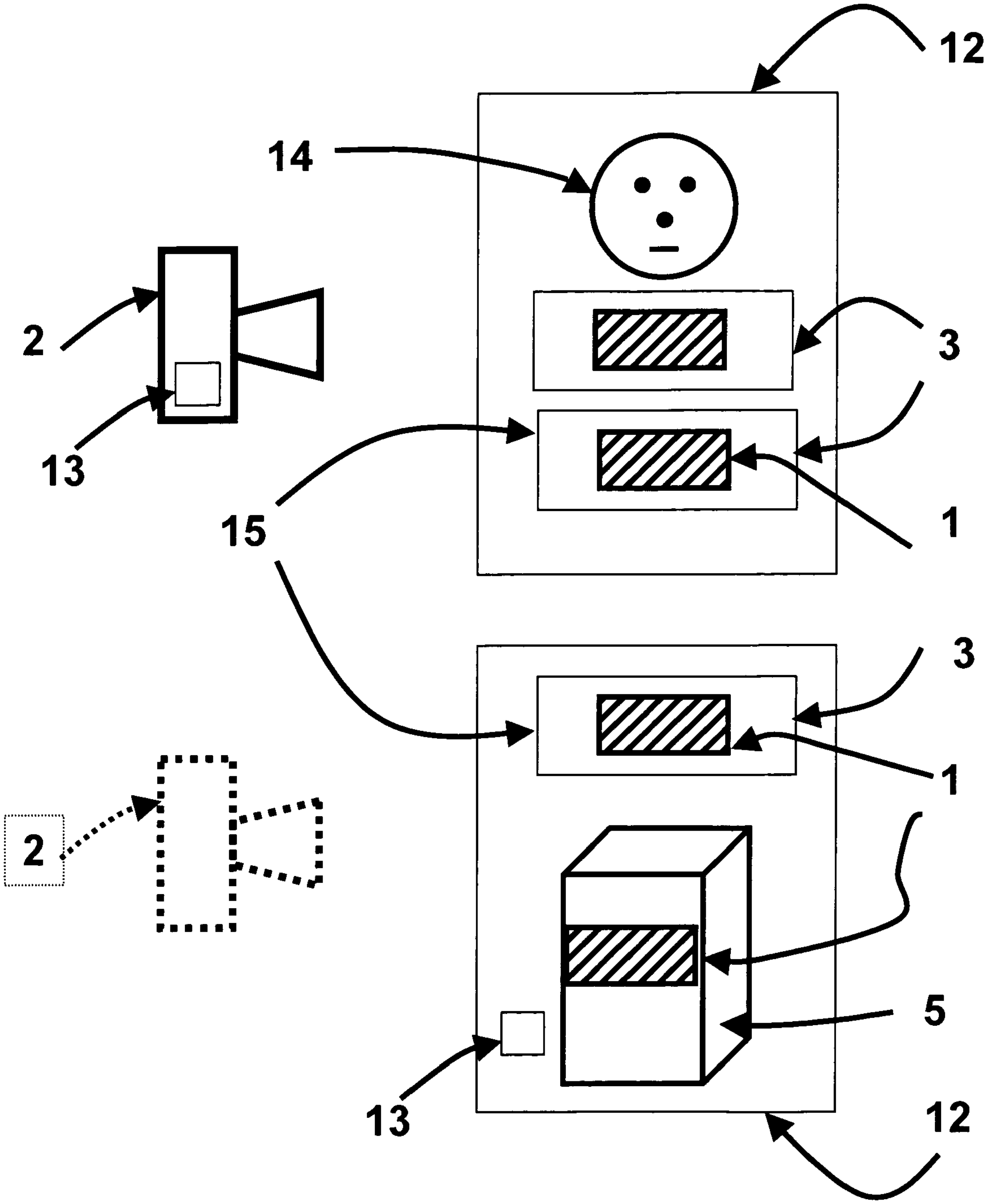
FIG. 6 shows the PICK Process

FIG. 6 shows an overview of the PICK process. The camera 2 takes a video of the cards 3 to be used, the surroundings, and the containers 5. After the subject 14 is fingerprinted (or other biometrics are taken), the camera 2 then takes a picture 12 of the subject 14 with the cards 3 which display the unique identifier 1, which is then placed in the container 5. The memory card 13 is also placed in the container 5.

FIG. 7

Figure 7:
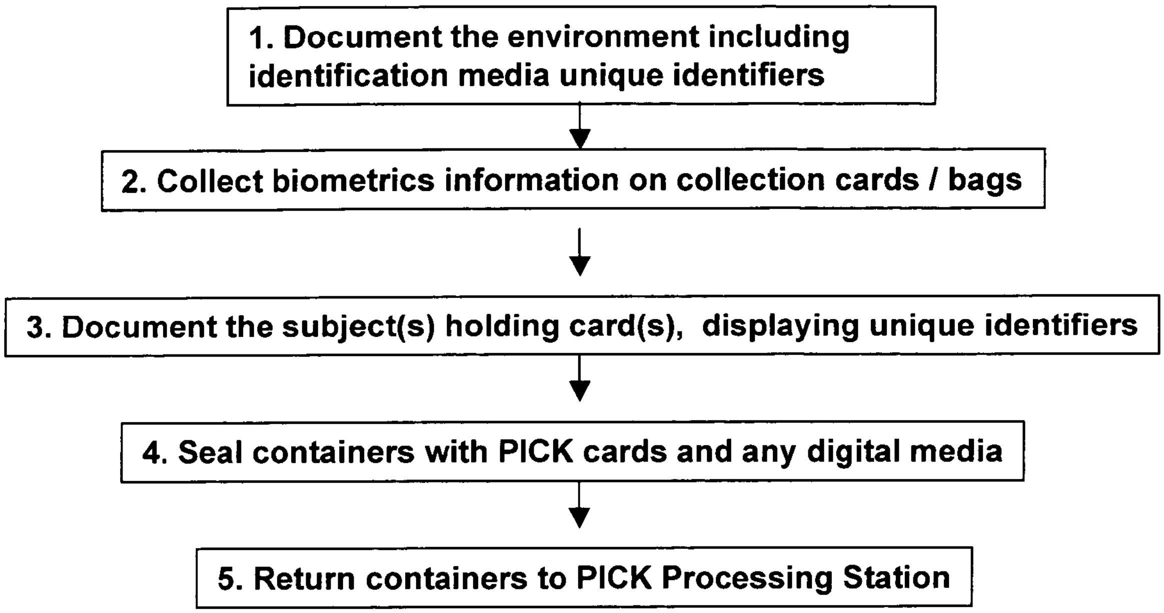
FIG. 7 shows the PICK method

FIG. 7 shows a general flowchart for the entire PICK process. The preferred embodiment is based on a situation with at least two users.

Step 1 is for User A to use the digital camera 2 to take a general video 12 of the scene, establishing the number of subjects, the location, the reasons for recording, the identities of the users and any other relevant information. User A also briefly video records the PICK Cards 2 to be used. During this time, User B may explain the procedure to the subjects.

Step 2 involves User B actually recording the biometrics of the subjects. In the preferred embodiment, the PICK Card 3 is partially adhesive and designed for recording fingerprints, so User B removes the cards backing, gives the first subject powder to coat his or her fingers, and then fingerprints 7 the subject, using both rolls and slaps if time allows. Next, User B folds the attached clear plastic cover on top of the PICK Card 3. At this point, User A begins Step 4, while User B restarts Step 3 with the next subject.

In Step 3, User A uses the digital camera 2 to photograph 12 the subject 14 with the cards 3 that he or she was just had their biometrics 7 (and possibly DNA 8) recorded on, making sure to display the back of the cards 3, so the large unique identifier 1 is visible. Next, User A takes a brief video 12 of the individual subject, asking for his or her name, family associations, address, reason for being at the location, and any other information the user deems important. Following this, User A recovers the subject's PICK cards 3 and places them in the large container 4.

After the last subject completes Step 4 and his or her cards are place in the evidence bag, User A ejects the memory card 13 from the digital camera 2 and places it in the large container 4 and seals it. If time allows, the users may write information on the container 4 to expedite processing and for redundancy.

The container is dropped off at the nearest PICK Processing Station where there are more PICK cards, memory cards, powder, and evidence bags.

FIG. 8

Figure 8:
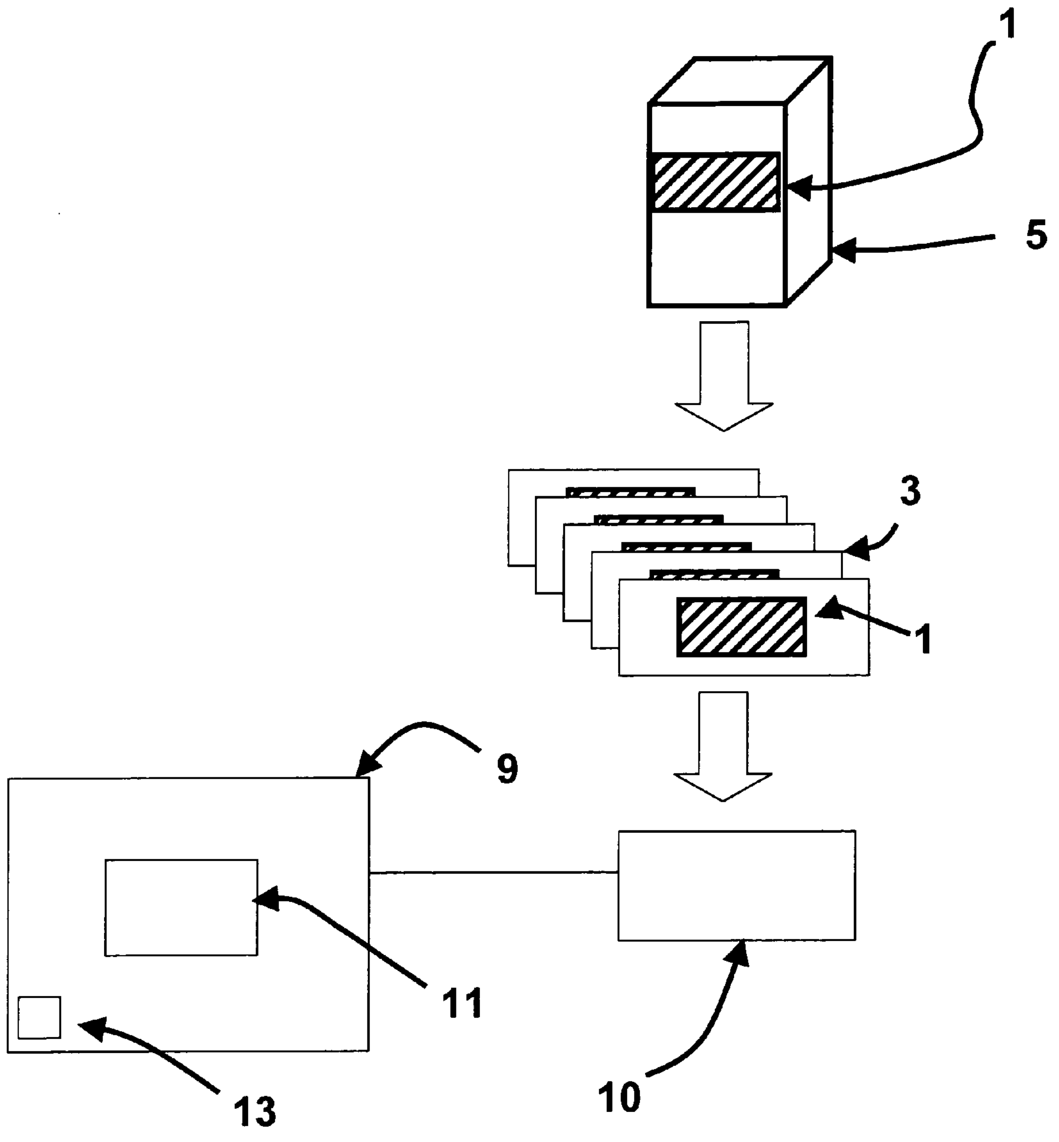
FIG. 8 shows the PICK Processing Station

FIG. 8 shows the components of a PICK Processing Station: A computer 9, a device 10 capable of reading the biometric information on the PICK cards (such as a scanner), and software 11 to process the PICK data. After the final step in FIG. 5, when the operator of the Processing Station has the container 5 with cards in it, he or she uses the PICK software 11 to create an entry for the location that the container 5 is from. The operator views the general video clip and records the number of subjects that were recorded along with all other relevant scene information. Next, the operator uses the device 10 to read the PICK cards 3, and, using the software 11, matches the unique identifier 1 on the card 3 to the unique identifier 1 in the subject's picture and video, creating a file containing all the pertinent information. That file, along with all the other subject files, can be exported to an EFTS file.

CONCLUSION, RAMIFICATION AND SCOPE OF

The Pocket Identification Collection Kit provides a novel approach to recording the biometrics of individuals in a field environment. By using lightweight, durable materials, instead of complex computer systems in the field, the PICK provides flexibility, simplicity, and speed that other systems cannot match. The system allows for many subjects to be fingerprinted quickly, even in highly demanding situations.

Due to the flexibility, simplicity and speed of the PICK system, the number of people fingerprinted in a conflict or campaign can be greatly expanded. Those subjects that are normally the most difficult to record the biometrics of, are also the most useful to have the fingerprints and other biometric and personal data of. The PICK system allows for data on these types of subjects to be collected, analyzed, and then converted to EFTS files and used for vetting later. An effective campaign of fingerprinting subjects can greatly improve the security of operations by providing highly reliable background on potential personnel. Reliably knowing the background of suspects can also aid in the prosecution of criminals.

While the above description contains many specificities, these should not be construed as limitations on the scope of the invention, but rather as an exemplification of one of the preferred embodiments. Many other variations are possible, including but not limited to, a system to record hand geometry, palm prints, retinal scans and voice recording.

What is claimed is:

1. A method of rapidly collecting identification data in the field and processing said identification data at a designated processing station, the method comprising the following steps in the order named:

(a) collecting video data of a scene;

(b) collecting biometric information and identification data of subjects, wherein said collecting biometric information and identification data comprises recording biometric information of subject on a biometric collection card with unique identifier or collecting DNA samples to be placed in a DNA container with unique identifier, photographing said subject holding said biometric collection card or DNA container with unique identifier, and video taping said subject stating personal information and other information a User that carries out the method deems important;

(c) placing said biometric collection card or DNA container with unique identifier in a container for each subject;

(d) placing all subject containers and the digital camera's memory card in a large evidence container;

(e) transporting said evidence container from the field to a designated computer processing station;

(f) viewing general video data of the scene and of the subjects at said computer processing station;

(g) using a biometric scanning device as a means for reading the biometric collection cards;

(h) using the computer software as means for matching the biometric collection card for each subject with his or her identification data from said digital camera's memory card using the unique identifier;

(i) creating a subject file concretely linking subject's biometric information, image of subject's face, and subject's biographical and personal information, wherein said file is formatted for exporting, further processing or storage; and (j) formatting said subject file to comply with prescribed formats comprising Electronic File Transfer Systems (EFTS), internationally accepted, and law enforcement formats.

2. The method as recited in claim 1, wherein one or more Users carry out the process concurrently, in concert, or in succession.

3. The method as recited in claim 1, wherein said unique identifier is printed on both sides of the biometric collection card or DNA container.

4. The method as recited in claim 1, wherein said collecting biometric information and identification data further comprises fingerprint rolls and slaps, hand geometry, and palm prints.

5. The method as recited in claim 1, wherein said collecting biometric information and identification data further comprises collecting his or her blood samples, inner cheek cells, hair, and skin samples.

6. The method as recited in claim 1, wherein said subject's personal information comprises name, address, family association, and reason for being at field location.

7. The method as recited in claim 1, wherein creation of said subject file is means for identifying personnel, security of operations, and aiding in criminal prosecution.

8. A system for creating biometric files, comprising:

(a) a card having a unique identifier and biometric information of a subject;

(b) an image of said subject wherein said card is displayed;

(c) a biometric reading device that reads the unique identifier and biometric information on said card;

(d) a computer operatively connected to said biometric reading device that stores said image, said unique identifier, and said biometric information; and (e) software implemented on said computer that processes said biometric information and said unique identifier read by said biometric reading device, that matches said biometric information to said image, and that generates an EFTS file having said biometric information matched to said image.

9. The system as recited in claim 8, wherein said software processes, matches, and generates when requested by a user of the system.

10. The system of claim 8, wherein said biometric information is selected from the group consisting of fingerprints, DNA, hand geometry, palm prints, blood samples, inner cheek cells, hair samples, and skin samples.

11. The system of claim 8, further comprised of a video of said subject wherein said subject is asked for his or her name and biographical information and wherein said video is linked to said biometric information and said image.

12. The system of claim 8, further comprised of a subject container having a unique identifier.

13. They system of claim 8, further comprised of an evidence container that is sealable and having space for two or more subject containers.

14. A method for creating a biometric file, comprising:

(a) collecting biometric information of a subject;

(b) attaching said biometric information to a card having a unique identifier;

(c) capturing an image of said subject wherein said card is displayed;

(d) storing said image on a computer;

(e) reading said unique identifier and said biometric information on said card using a biometric reading device;

(f) processing said unique identifier and said biometric information;

(g) matching said biometric information to said image; and (h) generating an EFTS file having said biometric information matched to said image.

15. The method of claim 14, wherein said processing step, matching step, and generating step is performed by software implemented on a computer when requested by a user.

16. The method of claim 14, wherein said biometric information is selected from the group consisting of fingerprints, DNA, hand geometry, palm prints, blood samples, inner cheek cells, hair samples, and skin samples.

17. The method of claim 14, further comprised of the step of recording a video of said subject wherein said subject is asked for his or her name and biographical information.

18. The method of claim 14, further comprised of the step of placing said biometric information into a subject container having said unique identifier.

19. The method of claim 14, further comprised of the step of placing biometric information into an evidence container that is sealable and having space for two or more subject containers.

20. The method of claim 14, wherein one or more users carry out the method concurrently, in concert, or in succession.

* * * * *